United States Patent
Miyamoto

(10) Patent No.: US 7,333,134 B2
(45) Date of Patent: Feb. 19, 2008

(54) WEB CAMERA AND METHOD FOR SENDING MOVING IMAGE

(75) Inventor: Takashi Miyamoto, Saitama (JP)

(73) Assignee: Fujifilm Corporation, Tokyo (JP)

( * ) Notice: Subject to any disclaimer, the term of this patent is extended or adjusted under 35 U.S.C. 154(b) by 847 days.

(21) Appl. No.: 10/684,366

(22) Filed: Oct. 15, 2003

(65) Prior Publication Data

US 2004/0090528 A1  May 13, 2004

(30) Foreign Application Priority Data

Nov. 11, 2002  (JP) ............................. 2002-326994

(51) Int. Cl.
*H04N 5/232* (2006.01)
*H04N 5/222* (2006.01)
*H04N 5/225* (2006.01)

(52) U.S. Cl. ................................ 348/211.1; 348/207.1; 348/333.01

(58) Field of Classification Search ............. 348/211.1, 348/211.2, 211.3, 333.06, 333.07, 207.1, 348/207.11, 211.8
See application file for complete search history.

(56) References Cited

U.S. PATENT DOCUMENTS

| | | | | |
|---|---|---|---|---|
| 6,067,571 A | * | 5/2000 | Igarashi et al. | ............. 709/232 |
| 6,335,760 B1 | * | 1/2002 | Sato | ......................... 348/397.1 |
| 7,114,174 B1 | * | 9/2006 | Brooks et al. | .............. 725/105 |
| 2002/0126135 A1 | * | 9/2002 | Ball et al. | .................... 345/600 |

FOREIGN PATENT DOCUMENTS

JP  2000-092437 A  3/2000

* cited by examiner

*Primary Examiner*—Ngoc-Yen Vu
*Assistant Examiner*—Adam L. Henderson
(74) *Attorney, Agent, or Firm*—Birch, Stewart, Kolasch & Birch, LLP

(57) ABSTRACT

A terminal distinction circuit distinguishes the terminal type. When the terminal is a PC, moving image data is sent directly from a moving image buffer memory to a transmission image memory. The transmission image memory sends moving image data together with a synchronization signal to the terminal via a broadband modem. When the terminal is a cellular phone or a PDA, an animation generating circuit reads images of every three picture frames from moving image data having thirty picture frames per second. The animation generating circuit scales down an image of each picture frame according to the display capability of the terminal, and then subtracts the number of color. Image data of ten picture frames is converted into one animation GIF file. The animation GIF file is sent to viewer's terminal via the broadband modem.

8 Claims, 4 Drawing Sheets

WEB CAMERA AND METHOD FOR SENDING MOVING IMAGE

This nonprovisional application claims priority under 35 U.S.C. § 119(a) on Patent Application No. 2002-326994 filed in JAPAN on Nov. 11, 2002, which is herein incorporated by reference.

BACKGROUND OF THE INVENTION

1. Field of the Invention

The present invention relates to a web camera which sends a photographed moving image to a terminal such as a PC, a cellular phone and the like, after converting the moving image to a format suitable for the terminal type.

2. Background Arts

A web camera installed in, for example, tourist destinations or famous spots sends photographed moving image data to viewers' PCs (personal computers) through the Internet. Received moving image data is reproduced as the moving image on a monitor of the PC by use of a web browser. By using a streaming mode which concurrently receives and reproduces moving image data, viewers can see almost live moving images of the spots.

Recently, however, there is a need to see the moving image photographed by the web camera with a cellular phone or a communication-capable PDA (Personal Digital Assistant) which are widely used. The web browsers installed in the cellular phone and the PDA do not support the reproduction of the moving image in the streaming mode. Thus, the viewer cannot see moving image but static images of the photographed moving image.

An animation GIF (Graphics Interchange Format) is generally known as the moving image format which the cellular phone and the PDA can reproduce. The animation GIF (GIF animation) is widely used to reproduce, for example, a banner advertisement on a homepage of WWW (World Wide Web). A single animation GIF file is composed of a plurality of GIF images. Continuously displaying the plurality of GIF images makes it possible to reproduce a moving image.

Japanese Patent Laid-Open Publication No. 2000-092437 discloses a digital camera which outputs an animation GIF file. Upon pressing a shutter button, the digital camera makes continuous exposures at predetermined intervals. Continuously exposed image data is subject to a subtractive color process, and then is compressed with the LZW (Lempel Ziv Welch) method. Compressed data of a plurality of images is compiled into the single animation GIF file which is written into a flexible disk.

By use of a web camera which converts the photographed moving image into the animation GIF file, as described above, it is possible to reproduce the moving image with the cellular phone and the PDA. The maximum number of color of the animation GIF file, however, is 8 bits (256 colors), so that the animation GIF file lacks expressive power for the monitor of a PC which can display 24 bit (16.77 million) colors. Furthermore, since the frame rate (the number of picture frames per second) of the animation GIF is generally less than that of the streaming mode, the quality of the animation GIF file is unsatisfactory when the moving image is reproduced on the monitor of the PC.

SUMMARY OF THE INVENTION

An object of the present invention is to provide a web camera which sends a photographed moving image in a format suitable for any type of terminal, such as PC, cellular phone and the like.

To achieve the above object, a web camera for sending a moving image of a subject to a plurality of terminals through the Internet comprises a photographing device, an animation generating circuit, a terminal distinction circuit, and a controller. The photographing device photographs the subject to output moving image data. The animation generating circuit processes moving image data to generate an animation file. The terminal distinction circuit distinguishes a terminal type. The controller sends moving image data to the terminal when the terminal type is the type that can reproduce moving image data. The controller sends the animation file to the terminal when the terminal is the type that cannot reproduce moving image data.

The animation generating circuit extracts picture frames contained in moving image data at predetermined intervals to generate the animation file.

The terminal distinction circuit detects the resolution of a monitor of the terminal. The animation generating circuit scales down an image of each picture frame contained in moving image data in accordance with the resolution of the monitor.

When the terminal distinction circuit cannot distinguish the terminal type, the animation generating circuit generates the animation file by extracting picture frames contained in moving image data at predetermined intervals, scaling down an image of each picture frame to a minimum size, and subtracting the number of color of the image to a minimum.

According to the present invention, the moving image photographed by the web camera is properly reproduced on the display, in accordance with the terminal type. The terminal having low image display capability such as a cellular phone, a PDA and the like can reproduce the animation without undue stress, since the size of animation data is small.

BRIEF DESCRIPTION OF THE DRAWINGS

The above objects and advantages of the present invention will become apparent from the following detailed descriptions of the preferred embodiments when read in association with the accompanying drawings, which are given by way of illustration only and thus do not limit the present invention. In the drawings, the same reference numerals designate like or corresponding parts throughout the several views, and wherein.

DETAILED DESCRIPTION OF THE EMBODIMENTS

Figure 1:
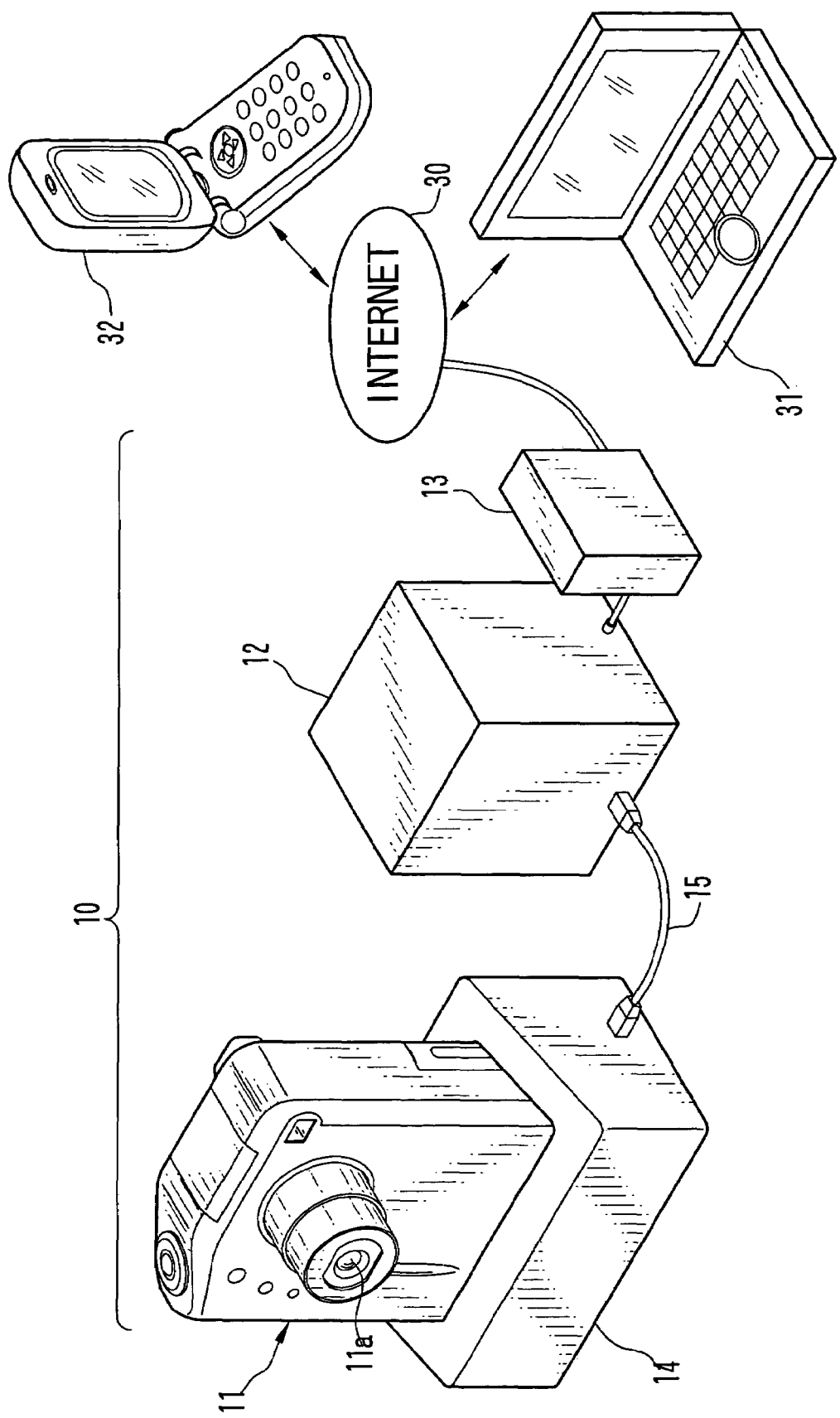
FIG. 1 is a perspective view of a web camera.

Referring to FIG. 1, a web camera 10 comprises a digital camera 11 having the function to photograph a moving image, a web server 12, and a broadband modem 13 for perpetually connecting the web server 12 to the Internet 30. The broadband modem 13 is connected to viewer's PCs 31 and portable terminals 32 (PDA, cellular phone and the like) through the Internet 30. The digital camera 11 is electrically connected to the web server 12 via a cradle 14 and a USB cable 15. Instead of USB cable 15, a wireless communication device may be used for transferring moving image data between the digital camera 11 and the web server 12.

The digital camera 11 outputs high quality moving image data of an uncompressed AVI (Audio Video Interleaved) format. Moving image data of the uncompressed AVI format contains thirty picture frames per second. Each of the picture frame has 1280×960 pixels, with 24 bit (16.77 million) colors.

Figure 2:
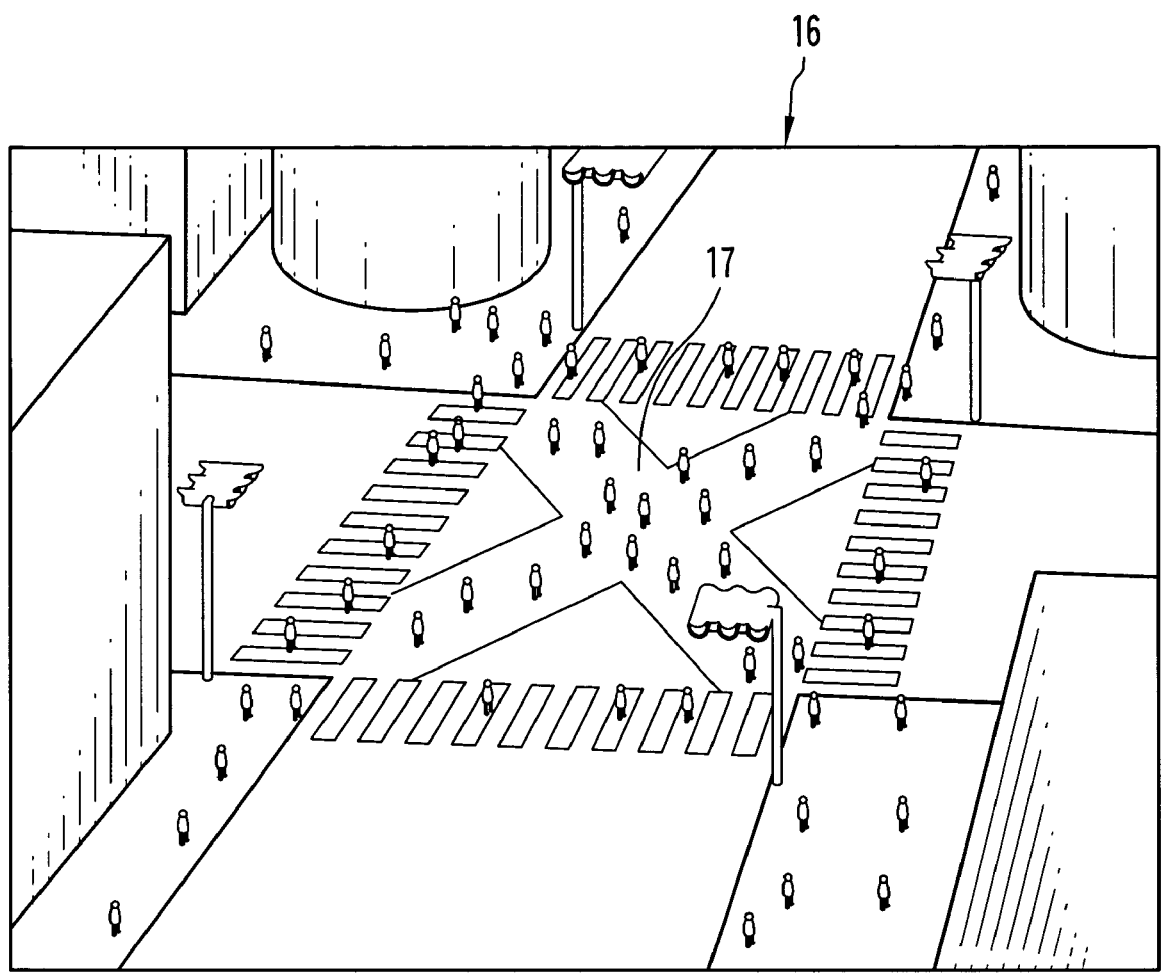
FIG. 2 is an explanatory view of an example of an image photographed by the web camera.

The web camera 10 is installed in, for example, the rooftop of a building viewing an intersection 17. The web camera 10, as shown in FIG. 2, successively takes photographs of the intersection 17 to generate a moving image. A viewer under contract with an operator inputs a predetermined address to a web browser of the terminal (the PC, cellular phone, communication-capable PDA or the like), and then inputs a password which identifies the individual viewer. Then, the terminal of the viewer is connected to the web camera 10. The moving image of the intersection 17 is reproduced on a monitor (for example, a LCD) 16 of the terminal with the numbers of pixels and colors that correspond to display capability thereof.

Figure 3:
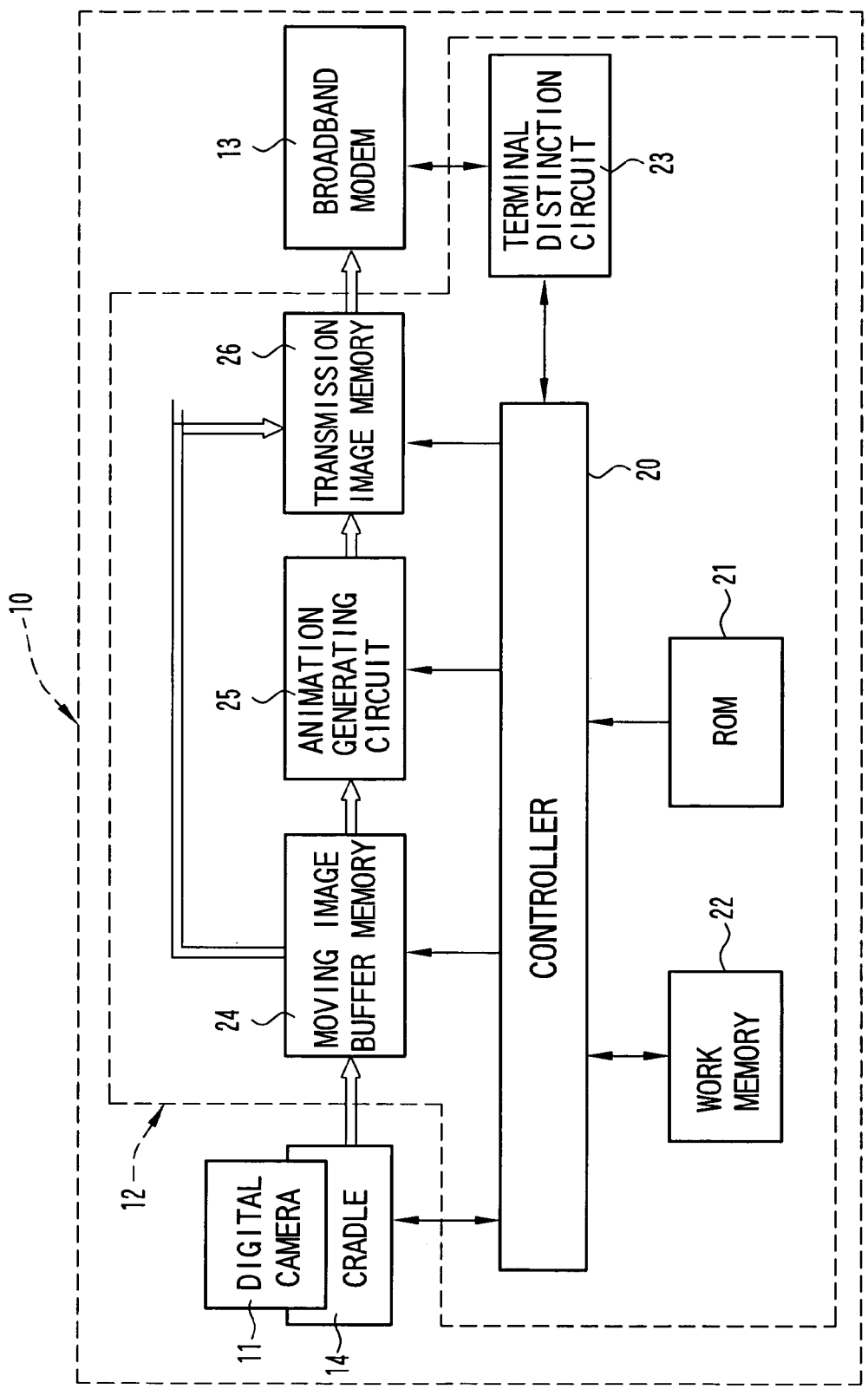
FIG. 3 is a block diagram showing the electrical structure of the web camera.

Referring to FIG. 3, the web server 12 comprises a controller 20, a ROM 21, a work memory 22, a terminal distinction circuit 23, a moving image buffer memory 24, an animnation generating circuit 25, and a transmission image memory 26.

The controller 20 executes a program stored in the ROM 21 to process moving image data outputted from the digital camera 11. The work memory 22 is used as a work area for the controller 20.

The moving image buffer memory 24 temporarily stores moving image data outputted from the digital camera 11. When the total size of moving image data reaches the storage capacity of the moving image buffer memory 24, the moving image buffer memory 24 continues storing new moving image data while deleting the oldest moving image data.

The terminal distinction circuit 23 extracts a viewer-agent field from a HTTP request header sent from each terminal to the broadband modem 13, in order to distinguish a type of the terminal. When the terminal uses the web browser of, for example, Internet Explorer (R) or Netscape Navigator (R), the terminal is distinguished into the PC. In the other cases, the terminal is distinguished into the cellular phone or the PDA.

When the terminal is distinguished into the PC, the terminal can directly reproduce moving image data in the uncompressed AVI format. The controller 20 sends moving image data from the moving image buffer memory 24 to the transmission image memory 26. The transmission image memory 26 adds a synchronization signal to moving image data for the purpose of generating streaming data. The synchronization signal synchronizes with the frame intervals (30 picture frames per second) of the photographed moving images. Since the transmission image memory 26 sends streaming data to the terminal via the broadband modem 13, a moving image with high quality is reproduced on the web browser of the PC.

When the terminal is distinguished into the cellular phone or the PDA, the controller 20 activates the animation generating circuit 25, since the terminal does not support the reproduction of the moving image in a streaming mode. The animation generating circuit 25 reads images of every three picture frames, that is, ten picture frames in total, from moving image data of one second having thirty picture frames stored in the moving image buffer memory 24.

The terminal distinction circuit 23 extracts resolution information of the LCD of the cellular phone or the PDA from the FTTP request header, to send a resolution signal to the controller 20. When the terminal distinction circuit 23 cannot extract the resolution information for some reason, the terminal distinction circuit 23 sends a resolution unknown signal to the controller 20.

The controller 20 determines the resolution of the LCD from the resolution signal. When the resolution of the LCD is 120×160 pixels, in other words, when the terminal is the cellular phone, the animation generating circuit 25 decreases the resolution of each picture frame into 120×90 pixels. The number of color is subtracted into 256 (8 bits) in a subtractive color process, before image data compression with the LZW method. Compressed image data of ten picture frames converted into a single animation GIF file is outputted to the transmission image memory 26. The transmission image memory 26, which also functions as a buffer memory, sends plural animation GIF files stored therein to the broadband modem 13 in order of occurrence.

When the resolution of the LCD is 160×160 pixels, or 320×320 pixels, in other words, when the terminal is the PDA, the animation generating circuit 25 reduces the resolution of each picture frame into 160×120 pixels or 320×240 pixels. The number of color is subtracted into 256, before image data compression with the LZW method. Compressed image data of ten picture frames is outputted to the transmission image memory 26 after being converted into a single animation GIF file.

The transmission image memory 26 sends the animation GIF file to the terminal through the broadband modem 13. When the terminal is the cellular phone or the PDA, as described above, the animation GIF file which is corrected according to the resolution of the LCD is sent. Hence, the web browser of the cellular phone or the PDA can reproduce the moving image.

This embodiment assumes that the smallest resolution of the LCD is 120×90 pixels, and the smallest number of color is 256. Thus, when the resolution unknown signal received, the controller 20 activates the animation generating circuit 25 to compress image data of each picture frame into 120×90 pixels with 256 (8 bits) colors. Processed image data of ten picture frames is outputted to the terminal as a single animation GIF file through the transmission image memory 26 and the broadband modem 13.

The operation of the web camera 10 will be hereinafter described. A power source constantly supplied power to the web server 12. The digital camera 11 is constantly supplied with power through the USB cable 15 and the cradle 14. In other words, the digital camera 11 takes a moving image of the intersection 17 24-hour a day.

Figure 4:
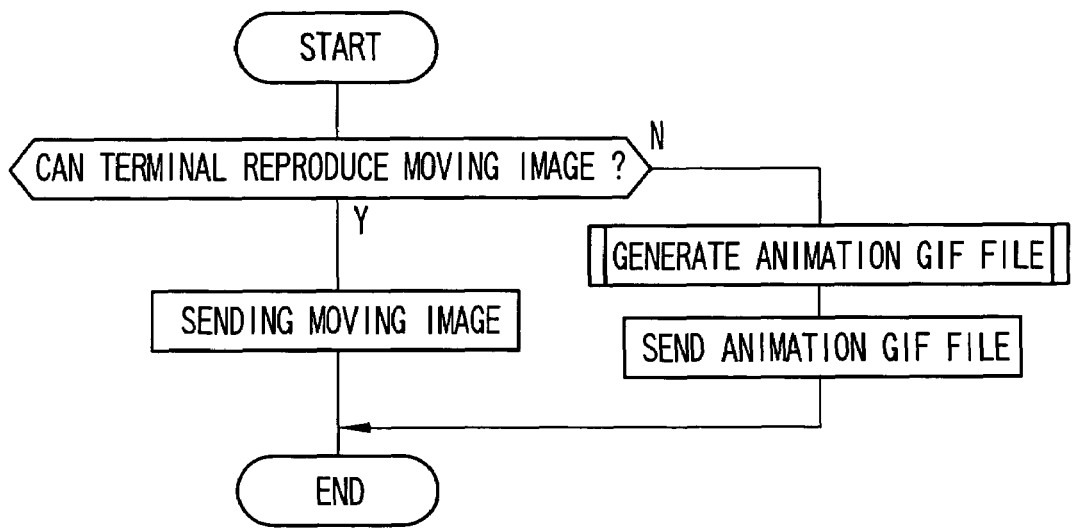
FIG. 4 is a flow chart of the operation of the web camera.
Figure 5:
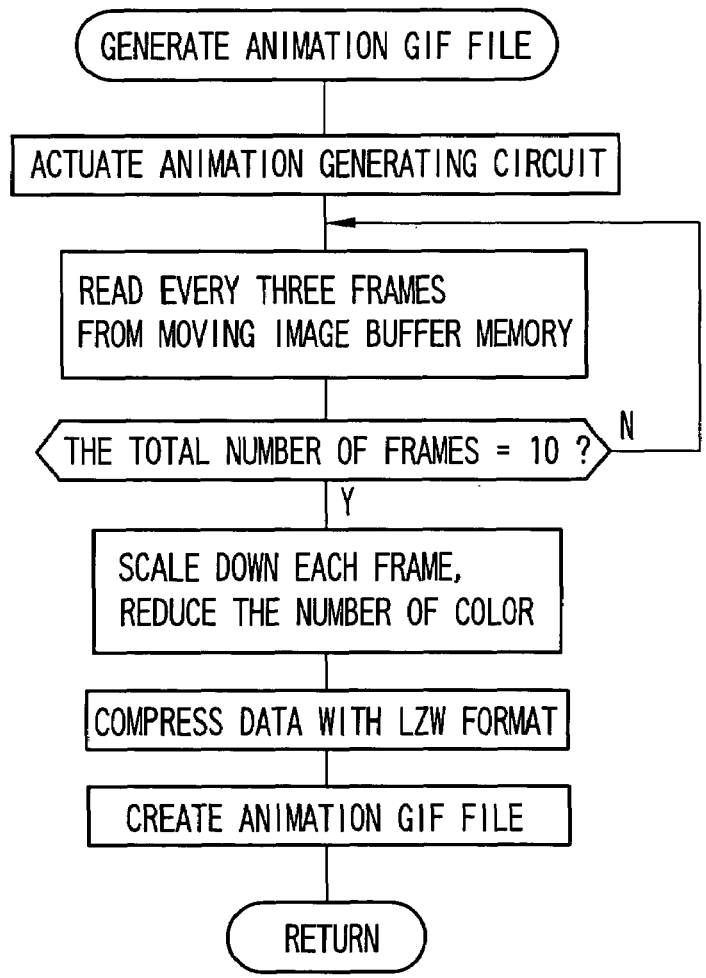
FIG. 5 is a flow chart of the process to generate an animation GIF file.

The controller 20 executes the program stored in the ROM 21 to process moving image data outputted from the digital camera 11. FIGS. 4 and 5 show flowcharts of the program. When the viewer accesses the broadband modem 13 via the terminal, the terminal distinction circuit 23 distinguishes whether the terminal is PC or the others (the cellular phone and the like). The terminal distinction circuit 23 sends the distinction signal to the controller 20.

When the terminal is a PC, moving image data is sent directly from the moving image buffer memory 24 to the transmission image memory 26. In other words, the animation generating circuit 25 is skipped. The transmission image memory 26 adds the synchronization signal to moving image data. Moving image data together with the synchronization signal are sent to the terminal in a streaming manner via the broadband modem 13. Thus, the moving image of the intersection 17 with high quality of 1280×960 pixels, 24 bits color, and 30 picture frames per second is reproduced on the LCD of the viewer's PC in the streaming mode.

When the terminal is a cellular phone or a PDA, the controller 20 activates the animation generating circuit 25. The animation generating circuit 25 reads images of every three picture frames, that is, ten picture frames in total, from moving image data of one second having thirty picture frames stored in the moving image buffer memory 24.

When the resolution signal is inputted to the controller 20, the ratio of width to length of the picture frame is changed to, for example, four to three, in accordance with the resolution of the display of the terminal. When the resolution of the terminal is 120×160, 132×162 and 160×160 pixels, image data is scaled down into 120×90, 132×99 and 160×120 pixels, respectively. When the controller 20 receives the resolution unknown signal, the resolution of the image is scaled down into 120×90 pixels.

Thereafter, the animation generating circuit 25 subtracts the number of color of each picture frame into 256. The animation generating circuit 25 compresses image data, and converts image data into one animation GIF file. The animation generating circuit 25 sends the animation GIF file to the viewer's terminal via the transmission image memory 26 and the broadband modem 13 through the Internet 30.

By successively sending the plural animation GIF files to the viewer's terminal, the animation of the intersection 17 composed of ten picture frames per second is reproduced on the LCD. The cellular phone and the PDA having low image display capability can reproduce the animation without undue stress, since the image data size is small. The image of each picture frame is displayed on the LCD approximately at the same time as photography, so that the moving image of the intersection 17 is smoothly reproduced on the LCD. The moving image photographed by the web camera 10, as described above, is smoothly reproduced on the cellular phone, the PDA and the like having the low image display capability, in addition to the PC.

In this above embodiment, the drawing speed of the animation GIF file is ten picture frames per second, but the present invention is not limited to it. The drawing speed of the animation GIF file may be five picture frames or fifteen picture frames per second. As the format of an animation image, a MNG (Multiple-Image Network Graphics) format may be used instead of the animation GIF.

In the above embodiment, the terminal such as a cellular phone or a PDA reproduces the animation GIF file, but the terminal type is not limited to them, as long as the terminal does not support the reproduction of the moving image in the streaming mode. In a case where the cellular phone or the PDA supports the reproduction of the moving image in the streaming mode, the moving image file composed of thirty picture frames per second may be reproduced, after image size correction in accordance with the resolution of the monitor and the number of output color.

In the above embodiment, moving image data in the uncompressed AVI format is outputted from the digital camera 10. Any format of the high quality moving image, however, is applicable, as long as the image of each picture frame can be converted into the GIF or PNG (Portable Network Graphics) format. By registering the terminal type in signing a contract, it is possible to identify the type of terminal by viewer's password or ID number. In this case, it becomes unnecessary to identify the terminal type by use of the browser information.

In the above embodiment, the web camera 10 takes the moving image of the intersection 17, but the present invention is not limited to it. The web camera may be installed in, for example, a nursery to show the state of children all the time. If the web camera 10 takes the moving image of a class, a viewer can take the class through the Internet without going to a school.

Although the present invention has been described with respect to the preferred embodiment, the present invention is not to be limited to the above embodiment but, on the contrary, various modifications will be possible to those skilled in the art without departing from the scope of claims appended hereto.

What is claimed is:

1. A web camera for sending a moving image of a subject to a plurality of terminals through the Internet, said web camera comprising:
   a photographing device for photographing said subject to output moving image data;
   an animation generating circuit for processing said moving image data to generate an animation file;
   a terminal distinction circuit for distinguishing a terminal type between a type that can reproduce said moving image data and a type that cannot reproduce said moving image data; and
   a controller for sending said moving image data to said terminal when said terminal is the type that can reproduce said moving image data, and for sending said animation file to said terminal when said terminal is the type that cannot reproduce said moving image data,
   wherein said terminal distinction circuit detects a resolution of a monitor of said terminal, and said animation generating circuit scales down a size of each picture frame contained in said moving image data, to a size smaller than said resolution of said monitor.

2. A web camera as recited in claim 1, wherein said animation generating circuit extracts picture frames contained in said moving image data at predetermined intervals to generate said animation file.

3. A web camera as recited in claim 1, wherein when said terminal distinction circuit cannot distinguish said terminal type, said animation generating circuit generates said animation file by extracting picture frames contained in said moving image data at predetermined intervals, scaling down an image of each of said picture frames to a minimum size, and subtracting the number of color of said image to a minimum.

4. A web camera as recited in claim 1, wherein a format of said animation file is animation GIF, and said animation generating circuit reduces the color number of each picture frame contained in said moving image data.

5. A web camera as recited in claim 1, wherein said photographing device is a digital camera.

6. A method for sending a moving image of a subject to a plurality of terminals through the Internet, said method comprising the steps of:
   (a) photographing said subject by a photographing device to output moving image data;
   (b) distinguishing, by a terminal distinction circuit, a terminal type between a type that can reproduce said moving image data and a type that cannot reproduce said moving image data;

(c) sending said moving image data to said terminal when said terminal is a type that can reproduce said moving image data; and (d) detecting a resolution of a monitor of said terminal, scaling down a size of each picture frame contained in said moving image data, to a size smaller than said resolution of said monitor, processing said moving image data to generate an animation file and sending said animation file to said terminal when said terminal is a type that cannot reproduce said moving image data.

7. A method as recited in claim 6, wherein said animation file is generated by extracting picture frames from said moving image data at predetermined intervals.

8. A method as recited in claim 7, further comprising the step of:

(e) sending said animation file to said terminal when said terminal distinction circuit cannot distinguish said terminal type, wherein an image of each frame in said animation file is scaled down to a minimum size, and the number of color of said image is subtracted to a minimum.

* * * * *